US009049123B2

(12) United States Patent
Kaminsky et al.

(10) Patent No.: US 9,049,123 B2
(45) Date of Patent: Jun. 2, 2015

(54) DETERMINING POLICY FOLLOW-UP ACTION BASED ON USER-SPECIFIED CODES

(75) Inventors: David L. Kaminsky, Chapel Hill, NC (US); Neeraj Joshi, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 491 days.

(21) Appl. No.: 11/970,635

(22) Filed: Jan. 8, 2008

(65) Prior Publication Data

US 2009/0177773 A1 Jul. 9, 2009

(51) Int. Cl.
| | |
|---|---|
| H04L 12/24 | (2006.01) |
| H04L 29/06 | (2006.01) |
| G06F 11/07 | (2006.01) |
| G06F 17/30 | (2006.01) |

(52) U.S. Cl.
CPC ......... *H04L 41/0893* (2013.01); *H04L 63/0263* (2013.01); *G06F 11/0772* (2013.01); *G06F 17/30067* (2013.01)

(58) Field of Classification Search
None
See application file for complete search history.

(56) References Cited

U.S. PATENT DOCUMENTS

| | | | | |
|---|---|---|---|---|
| 5,341,476 A * | 8/1994 | Lowell | | 709/219 |
| 6,032,159 A * | 2/2000 | Rivlin | | 1/1 |
| 6,484,187 B1 * | 11/2002 | Kern et al. | | 1/1 |
| 6,577,597 B1 * | 6/2003 | Natarajan et al. | | 370/232 |
| 6,654,908 B1 * | 11/2003 | Lindsay et al. | | 714/20 |
| 6,668,284 B1 * | 12/2003 | Parkhurst | | 719/313 |
| 6,980,555 B2 * | 12/2005 | Mar | | 370/395.21 |
| 7,299,504 B1 * | 11/2007 | Tiller et al. | | 726/30 |
| 7,716,184 B1 * | 5/2010 | Bromley | | 707/640 |
| 8,484,483 B2 * | 7/2013 | Dotan | | 713/187 |
| 2002/0133561 A1 * | 9/2002 | O'Brien et al. | | 709/213 |
| 2003/0217245 A1 | 11/2003 | Chase | | |
| 2003/0229760 A1 | 12/2003 | Doyle | | |
| 2004/0109410 A1 | 6/2004 | Chase | | |
| 2005/0033590 A1 | 2/2005 | Kaminsky | | |
| 2005/0033796 A1 | 2/2005 | Gilbert | | |
| 2005/0049949 A1 | 3/2005 | Asher | | |
| 2005/0055405 A1 | 3/2005 | Kaminsky | | |
| 2005/0055412 A1 | 3/2005 | Kaminsky | | |
| 2005/0065986 A1 * | 3/2005 | Bixby et al. | | 707/204 |
| 2005/0066095 A1 * | 3/2005 | Mullick et al. | | 710/200 |
| 2005/0197138 A1 | 9/2005 | Kaminsky | | |
| 2005/0198050 A1 | 9/2005 | Bivens | | |
| 2005/0240422 A1 | 10/2005 | Doyle | | |

(Continued)

OTHER PUBLICATIONS

"CIM Tutorial" by Wbemsolutions (Jun. 13, 2003).*

(Continued)

*Primary Examiner* — Ian N Moore
*Assistant Examiner* — Dung B Huynh
(74) *Attorney, Agent, or Firm* — Terrile, Cannatti, Chambers & Holland, LLP (57) ABSTRACT

A system, method and computer program product for determining policy follow-up action based on user-specified codes are set forth. When determining policy follow up action based upon user specified codes, a policy system receives function templates for permissible actions on a given resource type; each function template is annotated with indications of success and failure; the policy system performs an action on the resource; the policy system receives a status indication (or exception); the status indication is compared against the annotated function template; and, the policy system determines its next action based on that comparison.

12 Claims, 4 Drawing Sheets

(56) References Cited

U.S. PATENT DOCUMENTS

| | | | |
|---|---|---|---|
| 2006/0095552 A1* | 5/2006 | Dini et al. | 709/223 |
| 2006/0179040 A1 | 8/2006 | Bird | |
| 2006/0242532 A1* | 10/2006 | Joglekar et al. | 714/758 |
| 2007/0162966 A1 | 7/2007 | Agrawal et al. | |
| 2007/0240165 A1* | 10/2007 | Carey et al. | 719/310 |
| 2007/0255769 A1 | 11/2007 | Agrawal et al. | |
| 2008/0059633 A1* | 3/2008 | Hu | 709/225 |
| 2012/0213355 A1* | 8/2012 | Ishibe | 379/251 |
| 2014/0047267 A1* | 2/2014 | Makinson et al. | 714/15 |

OTHER PUBLICATIONS

DMTF, CIM Policy Model White Paper, CIM Version 2.7, 2.7.0, Jun. 18, 2003.

* cited by examiner

DETERMINING POLICY FOLLOW-UP ACTION BASED ON USER-SPECIFIED CODES

BACKGROUND OF THE INVENTION

The present invention relates in general to data processing systems and in particular to determining policy follow-up action based on user-specified codes.

The prevalence of networked systems and applications in business environments has created a challenge for information technology (IT) administrators. As networks have become ever more heterogeneous and connected to each other, scalable and distributed management of IT infrastructure has become desirable. To address this issue, policy-based management is often exploited. Instead of running customized scripts and manually configuring and auditing networked devices and applications, policy-based management allows IT administrators to specify high-level directives or policies for various management tasks such as network planning, problem detection, security and quality of service (QoS) provisions.

Policies can be specified in many different ways and multiple approaches have been suggested for different application domains. However, as the heterogeneity of devices increases and the connectivity of networks grow, policies specified in different ways using varying techniques are increasingly interacting with one another. Policies can be written by a policy author that are irrelevant in a local environment, dominated by other policies or conflicting with already existing local policies. For example, a policy author may define a policy for Cisco switches. However, when the policy is deployed, the local domain may not have Cisco switches or the existing policies may conflict with the incoming policies for Cisco switches.

Many policy systems include constructs that allow structured actions. For example, the distributed management task force (DMTF) policy model supports condition-action policies. In the action section, the DMTF policy model supports constructs such as "do until success" and "do until failure".

This capability is useful for structured actions. For example, the intent of the policy might be "if a LUN is almost full, move the file system to a larger LUN". The action might be an operation to copy data from LUN 1 to LUN 2 and/or an operation to delete the data on LUN 1. Of course, if the first operation fails, then it would be undesirable to execute the second operation as this could cause a loss of data. Thus, a construct of "do until failure" is appropriate in this situation.

An issue in these policy systems is how to detect the failure of an operation. In some policy systems, failure is indicated with a status indication less than 0. In other policy systems, failure is indicated with a status indication of 0. In still other policy systems, failure is indicated by generation of an exception indication (i.e., by throwing an exception). Such heterogeneity means implementation of such standards can be challenging.

BRIEF SUMMARY OF THE INVENTION

In accordance with an aspect of the present invention, a system, method and computer program product for determining policy follow-up action based on user-specified codes are set forth. More specifically, when determining policy follow up action based upon user specified codes, a policy system receives function templates for permissible actions on a given resource type; each function template is annotated with indications of success and failure; the policy system performs an action on the resource; the policy system receives a status indication; the status indication is compared against the annotated function template; and, the policy system determines its next action based on that comparison.

In one embodiment, the invention relates to a method for determining policy follow-up action which includes receiving a function template that comprises an annotation of indications of success and failure for at least one permissible action on a given resource type, performing an action on a resource based upon the resource type and the function template corresponding to the given resource type, and determining a policy follow up action based upon the annotation of indications of success and failure.

In another embodiment, the invention relates to a computer program product for determining policy follow-up action. The computer program product includes a computer usable medium having computer usable program code embodied therewith. The computer usable program code includes computer usable program code configured to receive a function template for at least one permissible action on a given resource type where the function template comprises an annotation of indications of success and failure, computer usable program code configured to perform an action on a resource based upon the resource type and the function template corresponding to the given resource type, and computer usable program code configured to determine a policy follow up action based upon the annotation of indications of success and failure.

In another embodiment, the invention relates to a system which includes a processor, a data bus coupled to the processor, a module for receiving a function template for at least one permissible action on a given resource type where the function template comprises an annotation of indications of success and failure, a module for performing an action on a resource based upon the resource type and the function template corresponding to the given resource type, and a module for determining a policy follow up action based upon the annotation of indications of success and failure.

DETAILED DESCRIPTION OF THE INVENTION

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including, but not limited to the Internet, wireline, optical fiber cable, RF, etc.

Computer program code for carrying out operations of the present invention may be written in an object oriented programming language such as Java, Smalltalk, C++, or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 1:
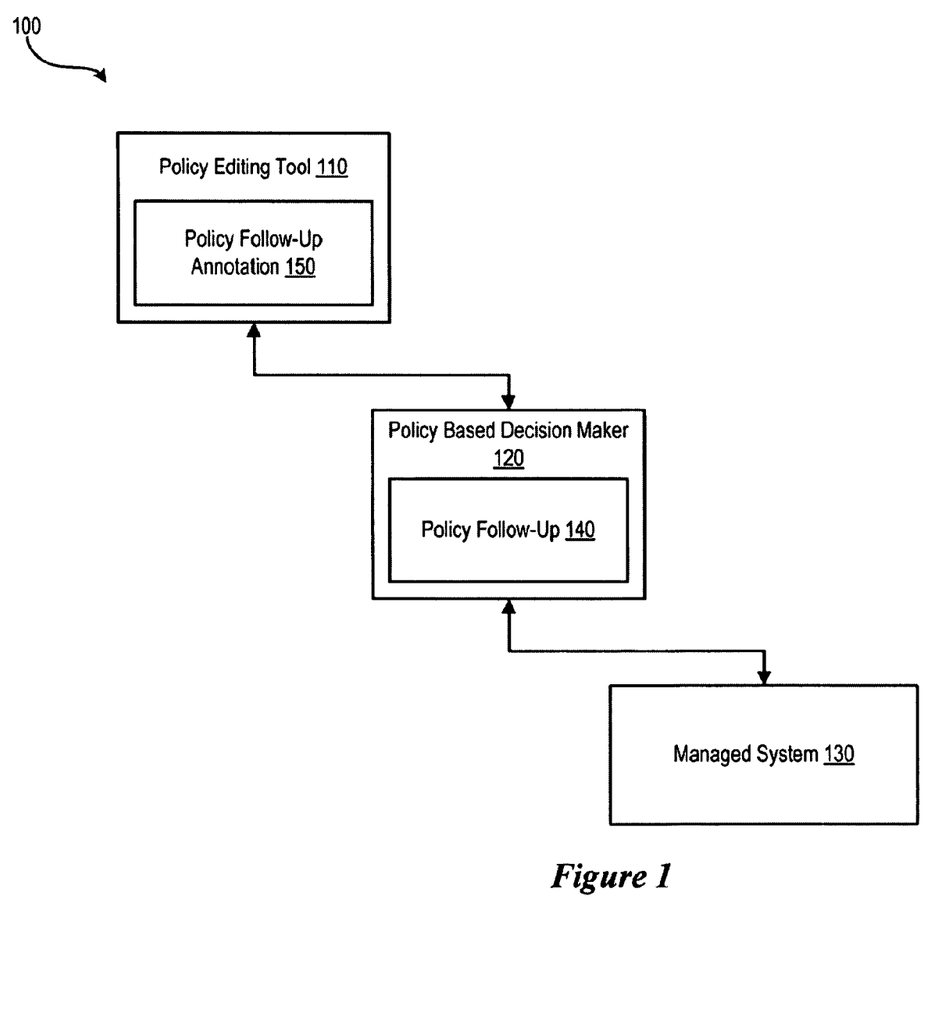
FIG. 1 shows a block diagram of a policy based management system.

Referring to FIG. 1, a block diagram of a policy system 100 having policy follow-up functionality is shown. The policy system 100 includes a policy-editing tool 110 and a policy-based decision maker 120. The policy-based decision maker 120 is coupled to a managed system 130 which may be coupled to the policy editing tool 110. The policy-editing tool 110 and policy-based decision maker 120 are used to communicate policy rules or directives to a number of devices such as desktop computers or servers or applications such as IP telephony, real-time video teleconferencing or multimedia data streaming networked throughout the managed system 130. The policy based decision maker 120 includes a policy follow-up module 140. The Policy editing tool 110 includes a policy follow-up annotation tool 150.

In the policy-based management system 100, a system administrator typically authors or writes policies that govern the behavior of the managed system 130 using the policy-editing tool 110. The policy follow up annotation module 150 enables a system administrator to annotate function templates with indications of success and failure. These policies are then deployed in the policy-based decision maker 120 (also known as a policy decision point) which is used to provide guidance to the managed system 130. With the policy follow-up module 140, when determining policy follow up action based upon user specified codes, the policy system 100 performs an action on a resource, the policy system receives a status indication in response to the action, the status indication is compared against the annotated function template (e.g., by the policy follow-up module 140), determines whether the operation succeeded or failed, and the policy system 100 determines (e.g., by the policy follow-up module 140) a next action based on that comparison.

Figure 2:
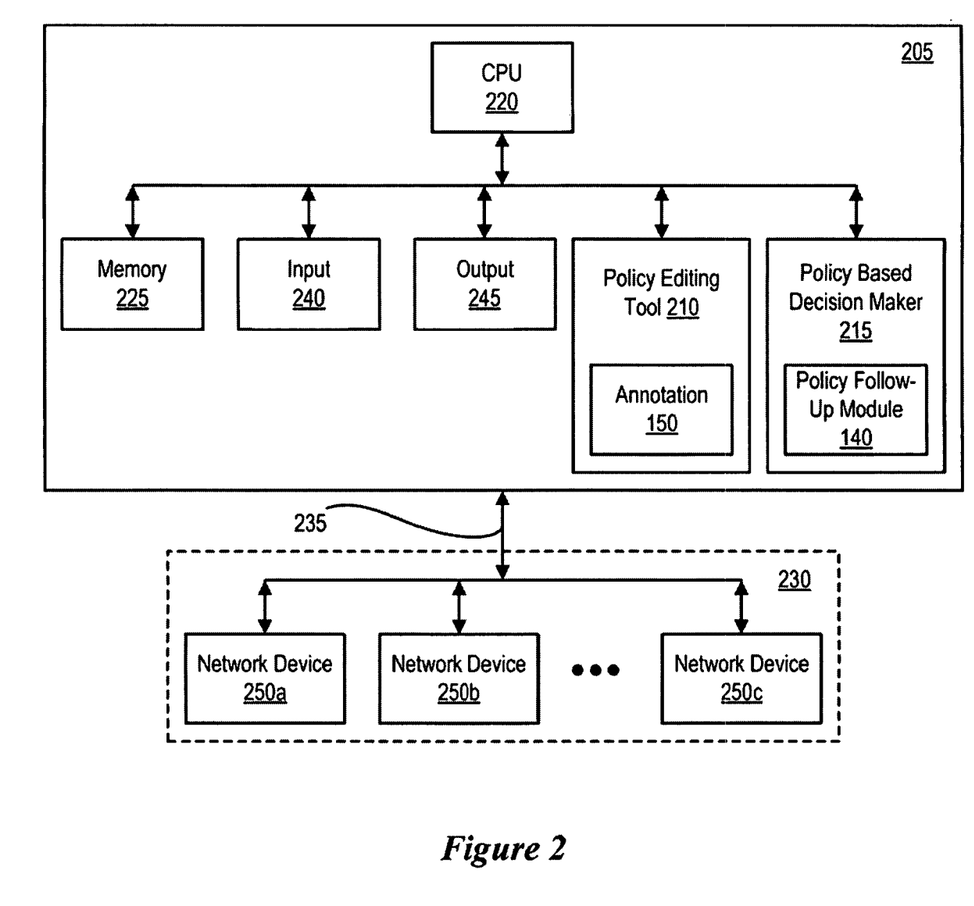
FIG. 2 shows a block diagram of a computer system which includes a policy editing tool and a policy based decision maker.

FIG. 2 is a block diagram illustrating a computer 205 including a policy-editing tool 210 (which includes the policy follow-up annotation module 150) and a policy-based decision maker 215 (which includes the policy follow-up module 140) according to an exemplary embodiment of the present invention. As shown in FIG. 2, the computer 205, which also includes a central processing unit (CPU) 220 and a memory 225, is coupled to a managed system 230 via a network-coupling device such as an Ethernet cable 235.

The memory 225 may include a random access memory (RAM) and a read only memory (ROM). The RAM functions as a data memory and stores data used during execution of a program in the CPU 220 and the ROM functions as a program memory for storing a program executed in the CPU 220. The memory 225 may also include a database, disk drive, tape drive, etc., or a combination thereof.

In addition to being coupled to the managed system 230 including a number of network devices 250a, b . . . x such as desktop computers or servers employing or facilitating applications such as IP telephony, real-time video teleconferencing or multimedia data streaming, the computer 205 may also be connected to input 240 and output 245 devices. The input device 240 may be constituted by a keyboard, mouse, etc., and the output device 245 may be constituted by a liquid crystal display (LCD), cathode ray tube (CRT) display, or printer among others.

It should be understood that at least some aspects of the present invention may alternatively be implemented in a computer-useable medium that contains a program product. Programs defining functions on the present invention can be delivered to a data storage system or a computer system via a variety of signal-bearing media, which include, without limitation, non-writable storage media (e.g., CD-ROM), writable storage media (e.g., hard disk drive, read/write CD ROM, optical media), system memory such as but not limited to Random Access Memory (RAM), and communication media, such as computer and telephone networks including Ethernet, the Internet, wireless networks, and like network systems. It should be understood, therefore, that such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

Figure 3:
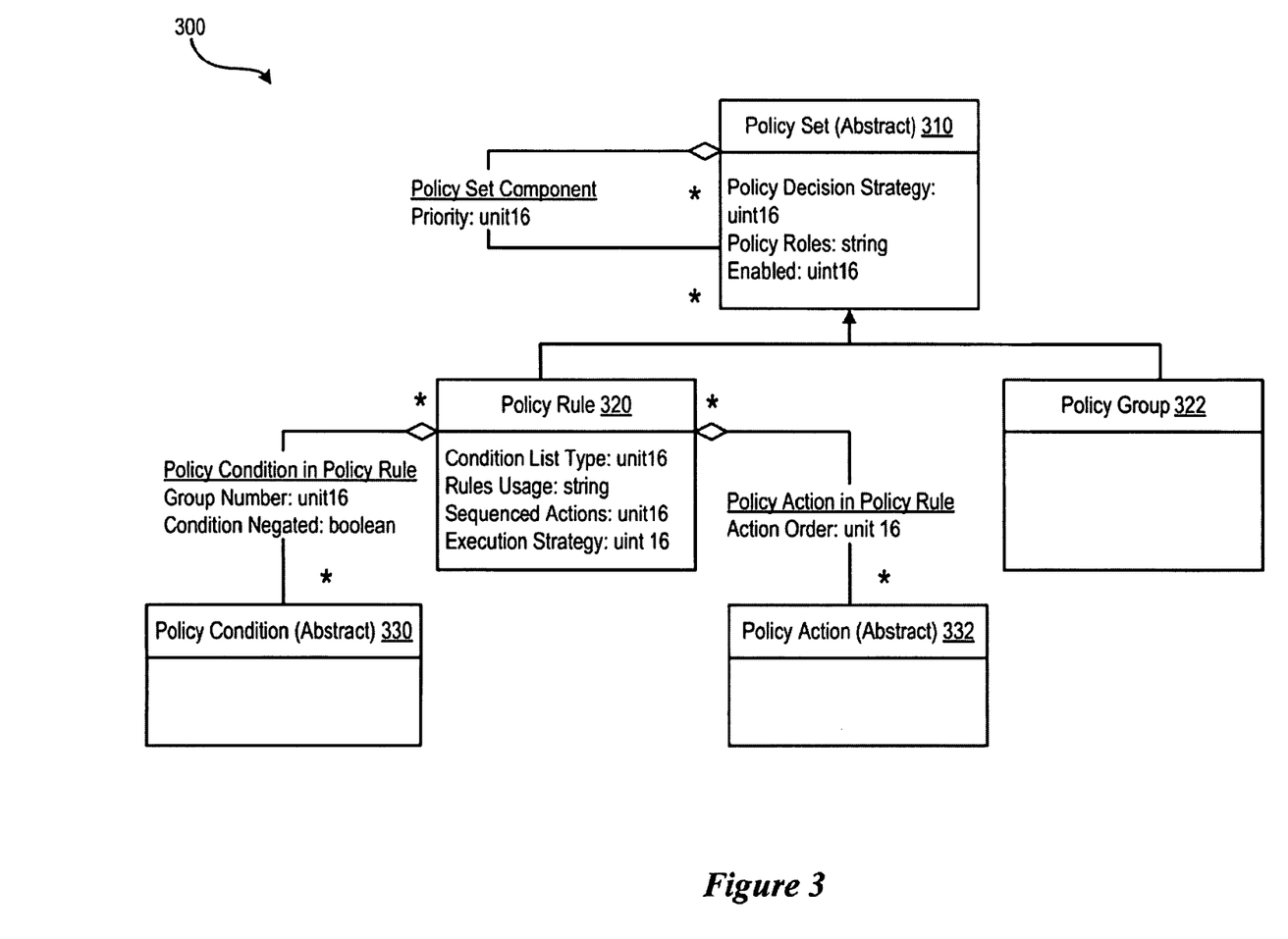
FIG. 3 shows a block diagram of a policy model class hierarchy.

Referring to FIG. 3, a class diagram of the classes that comprise a policy model in accordance with an embodiment of the present invention is shown. More specifically, the policy model 300 includes an abstract policy set class 310, a policy rule class 320, a policy group class 322, an abstract policy condition class 330 and an abstract policy action class 332. It will be appreciated that policy follow-up functionality may also be used with other policy models.

A policy describes any system configuration that controls system behaviors such as in "security policies" or "quality of service policies." Thus, a policy is a definite goal, course or method of action to guide and determine present and future decisions. In certain embodiments, the policy module corresponds to the DMTF policy model. The DMTF Policy Model provides a common framework for specifying system behaviors that are both sufficiently abstract to be independent of implementation-specific details and scalable to configuring large complexes of computer systems, i.e., the DMTF Policy Model is a specific model for expressing such policies in a general and scalable way. The policy module is implemented within the policy system 100. The DMTF Policy Model provides an object-oriented model that enables constructing policy rules of the form:

if <condition(s)> then <action(s)>.

The <condition(s)> term is a Boolean expression used to specify the rule selection criteria. These criteria may include temporal conditions (e.g., when does the rule apply), scoping conditions (e.g., to what does the rule apply) and state-related conditions (e.g., under what circumstances should the action(s) of the rule be attempted). When, for a resource under management, the <condition(s)> expression evaluates to True, the <action(s)> portion of the rule is attempted. These conditional directives are an implementation-independent description for the common aspects of system administration.

Scalability within the DMTF policy model is provided, in part, by the abstractions that also enable implementation-independence and, in part, by a role-based deployment framework. A policy role is an administratively assigned name for the enforcement role played by the policy system 100 that consumes sets of policy rules. The sets of rules are flagged with one or more policy roles for which they apply and the enforcement points know the roles that they play. The policy system 100, then delivers the appropriate policy rules to the enforcement points based on these named relationships. For example, rules marked with the policy role "DMZ Web Server" would be delivered to those web servers that are located in the DMZ of the administrative domain. Similarly, rules that are intended for use with Ethernet interfaces facing the Internet in the DMZ might be flagged with the policy role "DMZ External Ethernet" and the security gateways playing that role, i.e., in the DMZ and with externally facing Ethernet interfaces, would be recipients of these rules.

The PolicyRule class 320 is the central class used to aggregate the PolicyCondition 330 and PolicyAction 332 object instances. PolicyRule 320 instances may be aggregated into instances of PolicyGroup 322 instances to form coherent sets with the same Policy Role value or values. A PolicySet 310 is a common abstraction for the PolicyRule class 320 and the PolicyGroup class 322 because both classes can aggregate PolicySet (PolicyRule and PolicyGroup) instances.

A PolicySet 310, then, forms a coherent set with a common set of PolicyRole values and a decision strategy for selecting, based upon priority, which of the rules or sets of rules in the aggregation are to be evaluated. A PolicyRoleCollection class (not shown) may be used to identify the roles played by enforcement points that need to consume the PolicySets identified by PolicyRole. The PolicyRole, and therefore the elements collected in the PolicyRoleCollection, identifies the resource or resources to be managed using the PolicySet.

Annotations are an augmentation to the policy model 300 and are associated with the PolicyActions. For example, continuing the example set forth above, if the PolicyAction is a directive to copy data form LUN A to LUN B such as CopyData (LUN_A, LUN_B), and that directive returns the number zero on failure, then an annotation such as "FAILURE:=0" would be associated with the CopyData policy action. (Other forms of expressing annotations can also be used.)

Figure 4:
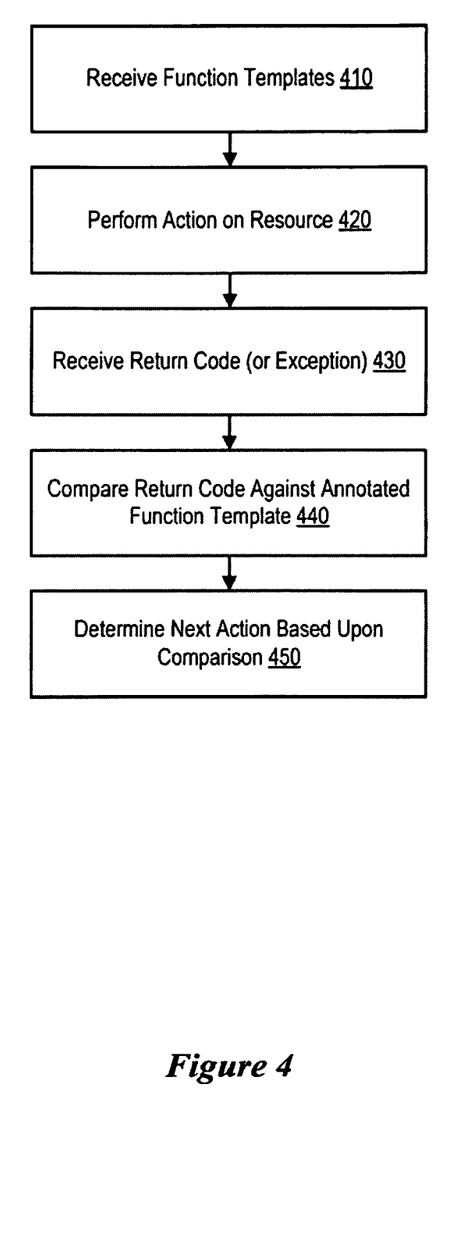
FIG. 4 shows a flow chart of the operation of a policy system which uses annotated resource models to determine follow up action.

Referring to FIG. 4, a flow chart of the operation of a policy system which uses annotated resource models to determine follow up action is shown. More specifically, when determining policy follow up action based upon user specified codes, a policy system 100 receives function templates for permissible actions on a given resource type at step 410. Each function template is annotated with indications of success and failure. Next; the policy system 100 performs an action on the resource at step 420. The policy system 100 receives a status indication (or exception) based upon performing the action on the resource at step 430. The policy system 100 then compares the status indication against the annotated function template at step 440. Next, the policy system 100 determines a next action to perform based on the results of the comparison at step 450.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A method for determining policy follow-up action comprising:
    receiving a function template for at least one permissible action on a given resource type, the function template comprising an annotation of indications of success and failure;
    performing an action on a resource based upon the resource type and the function template corresponding to the given resource type; and,
    determining a policy follow up action based upon the annotation of indications of success and failure, the policy follow-up action conforming to a definite course of action to guide and determine present and future decisions, the policy follow-up action conforming to a distributed management task force (DMTF) policy model, the DMTF policy model providing a common framework for specifying system behaviors that are scalable to configuring computer systems; and wherein
    the annotation of indications of success and failure is associated with a Policy Action class of the DMTF policy model, the Policy Action class comprises a CopyData Policy Action comprising a directive to copy data and the directive returns a failure indication comprising a failure annotation, the failure annotation being associated with the Policy Action, the failure annotation being set forth as FAILURE:=0; and,
    the DMTF policy model comprises a role-based deployment framework, the role-based deployment framework comprising an administratively assigned name for an enforcement role played by the DMTF policy model when consuming sets of policy rules.

2. The method of claim 1 wherein:
    the annotation comprises a user specified status indication;
    wherein determining a policy follow up action based upon the annotation of indications of success and failure further comprises determining a policy follow up action based upon the user specified indication.

3. The method of claim 2 wherein determining a policy follow up action based upon the annotation of indications of success and failure further comprises:
    comparing the user specified status indication against the annotation of the function template.

4. The method of claim 3 further comprising:
    determining a next action based on comparing the status indication against the annotation of the function template.

5. A non-transitory computer program product for determining policy follow-up action, the computer program product comprising:
    a computer usable storage medium having computer usable program code embodied therewith, the computer usable program code comprising:
        computer usable program code configured to receive a function template for at least one permissible action on a given resource type, the function template comprising an annotation of indications of success and failure;
        computer usable program code configured to perform an action on a resource based upon the resource type and the function template corresponding to the given resource type; and
        computer usable program code configured to determine a policy follow up action based upon the annotation of indications of success and failure, the policy follow-up action conforming to a definite course of action to guide and determine present and future decisions, the policy follow-up action conforming to a distributed management task force (DMTF) policy model, the DMTF policy model providing a common framework for specifying system behaviors that are scalable to configuring computer systems; and wherein
    the annotation of indications of success and failure is associated with a Policy Action class of the DMTF policy model, the Policy Action class comprises a CopyData Policy Action comprising a directive to copy data and the directive returns a failure indication comprising a failure annotation, the failure annotation being associated with the Policy Action, the failure annotation being set forth as FAILURE:=32; and,
    the DMTF policy model comprises a role-based deployment framework, the role-based deployment framework comprising an administratively assigned name for an enforcement role played by the DMTF policy model when consuming sets of policy rules.

6. The computer program product of claim 5 wherein: the annotation comprises a user specified status indication;
    wherein the computer usable program code configured to determine a policy follow up action based upon the annotation of indications of success and failure further comprises computer usable program code configured to determine a policy follow up action based upon the user specified indication.

7. The computer program product of claim 6 wherein the computer usable program code configured to determine a policy follow up action based upon the annotation of indications of success and failure further comprises:
    computer usable program code configured to compare the user specified status indication against the annotation of the function template.

8. The computer program product of claim 7 wherein the computer usable program code configured to determine a policy follow up action based upon the annotation of indications of success and failure further comprises:
   computer usable program code configured to determine a next action based on comparing the status indication against the annotation of the function template.

9. A system comprising:
   a processor;
   a data bus coupled to the processor;
   a module for receiving a function template for at least one permissible action on a given resource type, the function template comprising an annotation of indications of success and failure;
   a module for performing an action on a resource based upon the resource type and the function template corresponding to the given resource type; and,
   a module for determining a policy follow up action based upon the annotation of indications of success and failure, the policy follow-up action conforming to a definite course of action to guide and determine present and future decisions, the policy follow-up action conforming to a distributed management task force (DMTF) policy model, the DMTF policy model providing a common framework for specifying system behaviors that are scalable to configuring computer systems; and wherein
   the annotation of indications of success and failure is associated with a Policy Action class of the DMTF policy model, the Policy Action class comprises a CopyData Policy Action comprising a directive to copy data and the directive returns a failure indication comprising a failure annotation, the failure annotation being associated with the Policy Action, the failure annotation being set forth as FAILURE:=0;
   the DMTF policy model comprises a role-based deployment framework, the role-based deployment framework comprising an administratively assigned name for an enforcement role played by the DMTF policy model when consuming sets of policy rules.

10. The system of claim 9 wherein:
    the annotation comprises a user specified status indication;
    wherein the module for determining a policy follow up action based upon the annotation of indications of success and failure further comprises determining a policy follow up action based upon the user specified indication.

11. The system of claim 10 wherein the module for determining a policy follow up action based upon the annotation of indications of success and failure further comprises:
    a module for comparing the user specified status indication against the annotation of the function template.

12. The system of claim 11 further comprising:
    a module for determining a next action based on comparing the status indication against the annotation of the function template.

* * * * *